US005457146A

United States Patent [19]
Ogoe et al.

[11] Patent Number: 5,457,146
[45] Date of Patent: Oct. 10, 1995

[54] BLENDS OF POLYURETHANE AND CHLORINATED POLYETHYLENE

[75] Inventors: Samuel A. Ogoe, Missouri City, Tex.; Thomas D. Burns, Midland, Mich.

[73] Assignee: The Dow Chemical Company, Midland, Mich.

[21] Appl. No.: 139,372

[22] Filed: Oct. 20, 1993

[51] Int. Cl.⁶ .............................. C08F 8/00; C08G 63/48
[52] U.S. Cl. ............................ 524/409; 525/66; 525/129; 525/424; 525/440; 525/528
[58] Field of Search .................................. 525/125, 127, 525/129, 66, 424, 440, 528; 524/409

[56] References Cited

U.S. PATENT DOCUMENTS

| | | | |
|---|---|---|---|
| 3,442,977 | 5/1969 | Grabowski | 260/876 |
| 3,597,498 | 8/1971 | Christensen | 260/857 |
| 3,809,667 | 5/1974 | Coaker et al. | 260/31.8 |
| 3,882,191 | 5/1975 | Balatoni | 260/859 |
| 3,956,422 | 5/1076 | Takahashi et al. | 260/873 |
| 3,970,718 | 7/1976 | Takahashi et al. | 260/876 R |
| 4,150,066 | 4/1979 | Kudo et al. | 260/876 R |
| 4,239,861 | 12/1980 | Braese et al. | 525/57 |
| 4,429,076 | 1/1984 | Saito et al. | 525/67 |
| 4,430,477 | 2/1984 | Kumimune | 525/70 |
| 4,444,950 | 4/1984 | Sakano et al. | 525/67 |
| 4,499,237 | 2/1985 | Tacke et al. | 525/67 |
| 4,504,623 | 3/1985 | Heuschen et al. | 525/67 |
| 4,504,624 | 3/1985 | Heuschen et al. | 525/67 |
| 4,507,434 | 3/1985 | Ranade et al. | 525/67 |
| 4,532,282 | 7/1985 | Liu et al. | 524/157 |
| 4,537,933 | 9/1985 | Walker et al. | 525/71 |
| 4,564,653 | 1/1986 | Kamata et al. | 525/67 |
| 4,587,297 | 5/1986 | Walker et al. | 525/64 |
| 4,680,343 | 7/1987 | Lee | 525/148 |
| 4,743,654 | 5/1988 | Kyu et al. | 525/148 |
| 4,748,195 | 5/1988 | Hackl et al. | 523/445 |
| 4,839,410 | 6/1989 | Atomori et al. | 524/281 |
| 4,906,696 | 3/1990 | Fischer et al. | 525/148 |
| 4,957,974 | 9/1990 | Ilenda et al. | 525/301 |
| 5,030,681 | 7/1991 | Asato et al. | 524/504 |
| 5,109,051 | 4/1992 | Kroenke et al. | 524/444 |

FOREIGN PATENT DOCUMENTS 0396149   11/1990   European Pat. Off. .

OTHER PUBLICATIONS

Braun et al, "Properties of Poly(Vinyl Chloride)Blends with Polycarbonates and Chlorinated Polyethylene", *Makromol Chem., Macromol. Symp.* 29, 227–240 1989).
USSN 07/868,908 filed on Apr. 16, 1992.
USSN 08/122,952 filed on Sep. 20, 1993.
Derwent 14801E/08.
Derwent 42590V/23.
Derwent 90–112599/15.
Derwent 89–238936/33
Derwent 88–258546/37.
Derwent 88–258546/37.
Derwent 86–340562/52.
Derwent 85–298629/48.
Derwent 79–A9554B/05.
Derwent 76–50821X/27.
Chemical Abstract ("CA") 112:8458g.
CA 110:96533q.
CA 96:13648z.
CA 94:175992t.
CA 92:52932z.
CA 91:141495f.
CA 91:50489t
CA 89:220176q.
CA 89:187779p.
CA 89:101125n.
CA 89:54229n.
CA 89:54229n.
CA 88:165009q.
CA 88:105950e.
CA 88:8541q.
CA 87:202599j.
CA 109:24141s.
CA 105:192664a.
CA 106:68312r.
CA 105:154143x.
CA 104:6821f.
CA 73:25907w.
CA 75:130511b.
CA 83:148478w.
CA 85:95430g.
CA 99:196013t.
CA 102:133011a.
CA 103:124466w.
CA 104:130937n.
CA 105:98554t.
CA 107:238266u.
CA 112:8383d.
CA 112:78403j.
CA 113:79912g.
CA 97:24844g.
CA 97:24464h.
CA 89:216321r.
CA 89:198698n.
CA 87:54076u.
CA 112:140649z.
CA 108:141980e.
CA 107:41229c.
CA 106:85712p.
CA 105:44155v.
CA 102:158153m.
CA 100:104800k.
CA 99:12343w.
CA 99:46036p.
CA 97:24961t.
CA 94:122893e.
CA 92:77506b.

(List continued on next page.)

*Primary Examiner*—James J. Seidleck
*Assistant Examiner*—Mary Critharis

[57] ABSTRACT

A blend of polyurethane and chlorinated polyethylene which has a desirable balance of impact, ignition and heat resistance properties.

27 Claims, No Drawings

OTHER PUBLICATIONS

CA 88:171071v.
CA 86:172451q.
CA 86:73735d.
CA 86:44527g.
CA 111:196080d.
CA 111:88757w.
CA 109:38587d.
CA 108:151821t.
CA 107:8195r.
CA 105:181616k.
CA 105:98353b.
CA 103:143079p.
CA 98:180167q.
CA 97:73283g.
CA 97:24755d.
CA 97:7465s.
CA 97:7464r.
CA 97:7463q.
CA 97:7460m.
CA 97:7398x.
CA 96:175629w.
CA 99:24190g.
CA 88:122170t.
CA 90:105030w.
CA 103:7506y.

BLENDS OF POLYURETHANE AND CHLORINATED POLYETHYLENE

FIELD OF THE INVENTION

This invention relates to compositions containing polyurethane and chlorinated polyethylene, and to methods of preparation of such compositions.

BACKGROUND OF THE INVENTION

A polymeric blend containing polyurethane and chlorinated polyethylene forms a useful composition for molding purposes. Such a composition is particularly desirable when an ethylenically unsaturated monomer is graft polymerized to the chlorinated polyethylene.

SUMMARY OF THE INVENTION

In one aspect, this invention involves a composition of matter containing, in admixture, polyurethane and chlorinated polyethylene. In another aspect, this invention involves a composition of matter containing, in admixture, polyurethane and chlorinated polyethylene to which an ethylenically unsaturated monomer has been graft polymerized. In yet another aspect, this invention involves a composition of matter containing, in admixture, polyurethane, chlorinated polyethylene and a molding polymer. In a further another aspect, this invention involves a composition of matter containing, in admixture, polyurethane, chlorinated polyethylene and an additive which imparts flame or ignition resistance to the composition. This invention also involves a method of preparing a desirable molding composition by blending polyurethane and chlorinated polyethylene; and a method of improving properties such as the impact resistance, ignition resistance, heat resistance, thermal stability and/or paintability of a polyurethane/chlorinated polyethylene blend by graft polymerizing one or more ethylenically unsaturated monomers to the chlorinated polyethylene, and/ or by admixing with such blend the optional components of the compositons of this invention recited below.

It has been found that articles molded from the compositions of this invention exhibit desirably high levels of ignition, impact and heat resistance, and stability against thermal degradation.

The compositions of this invention are useful, for example, in the production of films, fibers, extruded sheets, multi-layer laminates and molded or shaped articles of virtually all varieties, especially data storage apparatus, appliance and instrument housings, motor vehicle body panels and other parts and components for use in the automotive, electrical and electronics industries. The methods of this invention are useful for preparing compositions and molded articles having applications which are the same as or similar to the foregoing.

DETAILED DESCRIPTION OF THE INVENTION

The compositions of this invention are those in which (a) polyurethane has been admixed in a polymeric blend with (b) chlorinated polyethylene. The compositions of this invention may, optionally, also contain (c) a styrenic copolymer, (d) an elastomeric impact modifier, (e) poly(vinyl chloride), and (f) one or more additional molding polymers. Suitable ranges of content for components (a) and (b) in the compositions of this invention, and suitable ranges of content for components (c), (d), (e) and (f) when they are present, expressed in parts by weight of the total composition, are as follows:

(a) polyurethane at least about 5 parts, advantageously at least about 20 parts, preferably at least about 30 parts, and more preferably at least about 40 parts, and yet not more than about about 95 parts, advantageously not more than about 90 parts, preferably not more than about 85 parts, and more preferably not more than about 75 parts;

(b) chlorinated polyethylene at least about 3 parts, advantageously at least about 15 parts, preferably at least about 20 parts, and more preferably at least about 30 parts, and yet not more than about about 95 parts, advantageously not more than about 80 parts, preferably not more than about 60 parts, and more preferably not more than about 50 parts;

(c) styrenic copolymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts;

(d) elastomeric impact modifier at least about 0.1 part, advantageously at least about 1 parts, preferably at least about 3 parts, and more preferably at least about 5 parts, and yet not more than about about 50 parts, advantageously not more than about 45 parts, preferably not more than about 40 parts, and more preferably not more than about 35 parts;

(e) poly(vinyl chloride) at least about 0.1 part, advantageously at least about 1 parts, preferably at least about 3 parts, and more preferably at least about 5 parts, and yet not more than about about 65 parts, advantageously not more than about 45 parts, preferably not more than about 40 parts, and more preferably not more than about 35 parts; and (f) molding polymer at least about 0.1 part, advantageously at least about 1 parts, preferably at least about 3 parts, and more preferably at least about 5 parts, and yet not more than about about 50 parts, advantageously not more than about 45 parts, preferably not more than about 40 parts, and more preferably not more than about 35 parts.

The number of weight parts of the various components from which the compositions of this invention may be prepared may, but need not necessarily, total to 100 weight parts.

Also included within this invention are the reaction products, if any, of the above named components when admixed in the compositions of this invention.

Preparation of the compositions of this invention can be accomplished by any suitable mixing means known in the art. Typically the polyurethane and chlorinated polyethylene, and other components or additives which are optionally present in the compositions of this invention, are dry blended in a tumbler or shaker in powder or particulate form with sufficient agitation to obtain thorough distribution thereof. If desired, the dry-blended formulation can further be subjected to malaxation, or to shearing stresses at a temperature sufficient to cause heat plastification thereof, for example in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence.

When softened or melted by the application of heat, the compositions of this invention can undergo fabrication and can therein be formed or molded using conventional techniques such as compression, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic substances, on any machine suitable for such purpose.

Component (a) in the compositions of this invention is a polyurethane, preferably a thermoplastic polyurethane. Thermoplastic polyurethane resins are essentially linear polymers which can be thermally processed by techniques such as melt-extrusion, compression molding and injection molding and which are characterized by the presence of a repeating carbamate group —[—NHC(O)—]— in its backbone structure. Typically, thermoplastic polyurethane resins are prepared by reacting a polyol, preferably a polyol having a high molecular weight of at least 500 and being nominally a diol, with an organic polyisocyanate, preferably a diisocyanate, usually in the presence of a low molecular weight difunctional chain-extending agent. The diol employed can be a polyester diol, a polyether diol or combinations thereof.

The type of high molecular weight diol selected can confer different characteristics and properties to the thermoplastic polyurethane (TPU) resin. Generally speaking, a TPU resin prepared from a polyester diol will display better toughness and oil/chemical resistance than one prepared from a polyether diol. Conversely, use of a polyether diol in preparing a TPU resin provides a product with better low temperature properties, resilience and resistance to hydrolytic degradation.

It is generally accepted that a TPU resin has a polymer morphology comprising "hard" and "soft" segments. Hard segments are molecular entities derived from reaction of the chain-extending agent with isocyanate. Soft segments are derived from the polyol/isocyanate reaction. The concentration of hard segments within the thermoplastic polyurethane is determined by the molar concentration of the chain-extending agent. For a given quantity of chain-extending agent, the molar concentration and hence hard segment concentration declines with increasing molecular weight of the agent.

Physical properties of the thermoplastic polyurethane resin can be controlled to an extent through the chain-extending agent. Increasing the quantity of a chain-extending agent such as, for example, 1,4-butane-diol, increases hardness and strength of the resulting resin, but can be detrimental to other physical properties, e.g. elongation. Combinations of chain-extending agents are frequently employed when it is necessary to enhance the flowability of such a resin, as described, for example, in U.S. Pat. No. 4,822,827, which is incorporated herein. Combinations of different chain-extending reagents provide different hard segments within the resin. The flowability of such resins is enhanced because the ability of the hard segments to "crystallize out" on cooling is reduced.

The thermoplastic polyurethane resins prepared in accordance with the present invention are essentially linear polymers having a weight average molecular weight of at least 30,000, preferably at least 40,000, and more preferably at least 45,000. In general, they have a glass transition temperature of about −50° C. to about −60° C. The thermoplastic polyurethane resins are characterized in that they contain few or no unreacted hydroxyl or isocyanate groups. Generally, the thermoplastic polyurethane resins can be further characterized in that they have a Shore Hardness of from at least 50 A and up to 85 D, and elongation percentage at break of up to 1000 percent. The thermoplastic polyurethane resins can be readily melt extruded, molded or injection molded to form goods and articles.

To provide a thermoplastic polyurethane resin by the process of this invention it is advantageous to employ the hereinabove described components in the following proportions.

For each mole of polyol having a molecular weight of from 500 to 5000 that is present, advantageously the chain-extending agent is present in an amount of from 0.5 to 15, preferably from 1.0 to 13, and more preferably from 1.0 to 10 moles. The exact mole quantity of chain-extending agent employed will be established experimentally and depends on the desired hardness for the resulting resin and the molecular weight of the polyol. Lower mole quantities of chain-extending agent are employed with lower molecular weight polyols to obtain a given hardness.

The organic diisocyanate is present in an amount sufficient to provide an overall reaction index of from 0.8, preferably from 0.9, more preferably from 0.95, and most preferably from 0.97, and up to 1.2, preferably up to 1.10, more preferably up to 1.05, and most preferably up to 1.03. For the purpose of this invention, the isocyanate reaction index is defined as the number of isocyanate groups per active hydrogen atom present in the reactive composition. An active hydrogen atom is one which is active in reacting with an isocyanate group as indicated by the Zerewitinoff test described by Kohler in *Journal of the American Chemical Society*, Vol. 49, page 3181 (1927), which predicts the tendency of a hydrogen-containing group to react with an isocyanate. The organic diisocyanate is typically present in an amount of about 0.95 to 1.10, preferably 1.0 to 1.05, moles per mole of polyol.

The polyol employed in the process of this invention for manufacturing a thermoplastic polyurethane resin is essentially a linear hydroxyl-terminated material which has an average molecular weight of from 500 to 5,000. The polyol molecular weight is preferably from 650 and more preferably from 1,000, and preferably up to 4,000 and more preferably up to 3,000. It is further an advantage if the polyol or polyol composition employed in the process of this invention has a nominal or average functionality of form 1.8 to 2.25, preferably 1.9 to 2.2, and more preferably from 1.95 to 2.15. The term "average functionality" means the average number of active hydrogen atoms per molecule, such active hydrogen atoms being associated with, in the case of polyols, the hydroxyl group.

The polyol employed in the process of the invention can be a polyether polyol, a polyester polyol or mixtures thereof. When a polyether polyol is employed, advantageously it will have a molecular weight of from 500 to 3,000. When a polyester polyol is employed, advantageously it will have a molecular weight of from 650 to 4,000.

Small quantities of compounds having a molecular weight of 500 or more and containing less than an average of 1.8 active hydrogen atoms per molecule, or more than 2.5 active hydrogen atoms per molecule, may also be employed in combination with the polyol provided the average functionality is as discussed above. Use of such additional compounds may be desirable in particular circumstances for enhancement of physical properties of the resin.

The polyether polyols contemplated for use in this present invention can readily be prepared by polymerizing a cyclic ether such as, for example, tetrahydrofuran, or by reacting one or more alkylene oxides with an initiator containing an average of 2 active hydrogen atoms per molecule. Use of catalysts such as boron trifluoride potassium hydroxide, triethylamine, tributyl amine and the like is generally advantageous. Typically, the alkylene oxide will be ethylene oxide, propylene oxide, 1,2- or 2,3-butylene oxide and/or epichlorohydrin. Exemplary of suitable initiators are water, glycols such as ethylene glycol, propylene glycol, butylene glycol, hexylene glycol or dialkylene glycols. Suitable polyether polyols for use in this present invention include, for example, those containing at least about about 50 weight percent oxyethylene (—O—CH$_2$—CH$_2$—) units, or a polyoxyethylene/polyoxypropylene block copolymeric glycol, or a mixture of more than one of such polyols. Suitable commercially available polyether polyols and preferred for use in this present invention include products sold by The Dow Chemical Company under the trademark VORANOL® polyols such as VORANOL® 5287 polyol and VORANOL® EP 1900 polyol.

The polyester polyols contemplated for use in the present invention are any of the conventional polyester diols known to those skilled in the art and include poly(alkylene alkanedioate) diols and poly(oxycaproyl) diols. The poly(alkylene alkanedioate) diols can suitably be prepared via well-known esterification techniques using a predetermined molar excess of an aliphatic glycol with relation to a dicarboxylic acid such as described in, for example, U.S. Pat. No. 2,423,823, which is incorporated herein. Adipic acid is the preferred dicarboxylic acid although succinic, glutaric, sebacic, malonic, maleic, fumaric or terephthalic acids may be used as well. Illustrative of the aliphatic glycols which can be employed for the preparation of poly(alkylene alkanedioate) diols are ethylene glycol, 1,3-propylene glycol, 1,4-butanediol, 1,3-butylene glycol, neopentyl glycol, 1,6-hexanediol, 1,2-dimethyl-1,2-cyclohexanediol and 1,12-dodecanediol. Minor amounts of a polyfunctional alcohol such as 1,2,6-hexanetriol or pentaerythritol may also be used if desired.

The poly(oxycaproyl) diols contemplated for use in the present invention are well-known in the art and described in, for example, U.S. Pat. Nos. 3,169,945, 3,248,417, and 3,021,309 through 3,021,317, inclusive, each of which is incorporated herein. A general procedure involves reacting a molar excess of epsilion-caprolactone with an initiator which contains two active hydrogen-containing groups being capable of opening the lactone ring whereby it adds as an open chain to the site of the active hydrogen-containing group.

The chain-extending agent contemplated for use in the TPU of this invention is an active hydrogen compound having at least two functional groups having active hydrogen atoms suitable for reaction with available isocyanate groups and having an equivalent weight advantageously less than about 200, more preferably less than about 100, and a molecular weight of 400 or less, preferably from 60 to 400, more preferably from 60 to 300, and most preferably from 60 to 250. Chain extenders are preferably difunctional, that is, they have exactly two functional groups containing active hydrogen atoms per molecule. However, mixtures of difunctional and trifunctional compounds may also be useful. Suitable chain extenders include primary and secondary diamines, amino alcohols, amino acids, hydroxy acids, diols, glycols or mixtures thereof. Exemplary compounds include ethylene diamine, hydroxy amines such as ethanolamine, propanol amine, diethanol amine and the like. A chain extender is generally chosen to achieve preselected physical properties such as hardness, toughness, and the like, in a molded object.

Advantageous chain extenders include primary and secondary diamines which react readily with isocyanates. Such chain extenders include phenylene diamine, bis(3-chloro-4-aminophenyl)methane, 2,4-diamino-3,5-diethyl toluene, 2,6-diamine-3,5-diethyl toluene, trisecondary butanolamine, isopropanolamine, diisopropanolamine, N-(2-hydroxypropyl)ethylenediamine, N,N'-di(2-hydroxypropyl)ethylenediamine, dialkyl diaminobenzenes such as those disclosed in U.S. Pat. No. 4,526,905 (incorporated herein) and the like.

Dihydroxyl chain-extending agents may comprise aliphatic, cycloaliphatic or aromatic dihydroxyl compounds, or diols, having from 2–10 carbon atoms. Illustrative of such diols are ethylene glycol, 1,3-propanediol, 1,5-pentanediol, 1,6-hexanediol, 1,2-propanediol, 1,3-butanediol, 1,4-butanediol, 2,3-butanediol, 1,3-pentanediol, 1,6-hexanediol, 3-methylpentane-1,5-diol, 1,4-cyclohexanediol, and mixtures of two or more such diols. Compounds such as ethoxylated hydroquinone can also be employed as a chain-extending agent. The above-mentioned chain-extending agents can be used alone or in admixture with each other or with other compounds including diethylene glycol, dipropylene glycol, tripropylene glycol, 3-methyl-1,5-pentane diol, ethanolamine, N-methyl diethanolamine, N-ethyl diethanolamine as well as ester diols obtained by esterifying adipic, azelaic, glutaric and the aliphatic dicarboxylic acids with aliphatic diols such as those exemplified above utilizing from 0.01 to 0.8 mole of acid per mole of diol. Also included as chain extending agents which can be used in the process are adducts obtained from an aliphatic diol or triol such as, for example, 1,4-cyclohexane dimethanol, neopentyl glycol, hexane-1,2-diol, ethylene glycol, butane-1,4-diol and trimethylolpropane with caprolactone in a mole ratio of from 0.01 to 2 moles of caprolactone per mole of diol or triol.

While any of the chain-extending agents exemplified above can be employed in the process of the invention, it is preferred to use 1,6-hexanediol, neopentyl glycol, 1,4-cyclohexane diol, ethylene glycol, bis(hydroxyethoxy)benzene, ethoxylated hydroquinone, diethylene glycol and, especially, 1,4-butanediol.

It is also possible to employ the chain-extending agent in combination with small amounts of compounds which are monofunctional or trifunctional compounds. Typically, the amount is not more than 0.2 and preferably not more than 0.1 mole per mole of polyol. Exemplary of monofunctional compounds are alcohols or chain-stopping agents, and of trifunctional compounds are glycerine or trimethylolpropane. Those additional compounds may be employed when it is desired to modify physical properties or processing characteristics of the thermoplastic polyurethane resin.

Any of the organic diisocyanates employed in the preparation of polyurethanes can be employed in preparing the TPUs by the process of this present invention. Such isocyanates may be aliphatic, aromatic or alicyclic isocyanates. Illustrative of such aromatic isocyanates are diphenylmethane diisocyanates including the 4,4'-isomer, the 2,4'-isomer and mixtures thereof, meta- and para-phenylene diisocyanates, chlorophenylene diisocyanates, α,α-xylylene diisocyanate, 2,4- and 2,6-toluene diisocyanate and mixtures of these latter two which are available commercially, 1,5-naphtalene diisocyanate, toluidine diisocyanate. Illustrative of such aliphatic isocyanates are hexamethylene diisocyanate, isophorone diisocyanate and methylene bis(cyclohexylisocyanate) including the 4,4'-isomer and 2,4'-isomer.

Advantageously, the organic diisocyanate employed in the process of this invention is an aromatic diisocyanate preferably comprising diphenylmethane diisocyanate. Advantageously, the organic diisocyanate consists essentially of diphenylmethane diisocyanate wherein the isomer 4,4'-diphenylmethane diisocyanate is present in an amount of from 50 to 100, preferably from 75 to 100, and more preferably from 90 to 100 weight percent and the remainder will generally be the 2,4'-diphenylmethane diisocyanate isomer and modified forms of these diisocyanates.

The modified forms of diisocyanates are those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols; such modified methylene bis(phenylisocyanates) are described in U.S. Pat. Nos. 3,394,164, 3,883,571, 4,115,429, 4,118,411 and 4,299,347, each of which is incorporated herein; and those wherein a minor amount of the diisocyanate has been converted to the corresponding carbodiimide as described in, for example, U.S. Pat. No. 3,384,653, which is incorporated herein. Mixtures of the above-described polyisocyanates can be employed if desired.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisocyanates obtained by phosgenation of a mixture of toluene diamines or crude diphenylmethylene diisocyanate obtained by phosgenation of crude diphenylmethylene-diamine. Crude isocyanates are disclosed in U.S. Pat. No. 3,215,652, which is incorporated herein.

The thermoplastic polyurethane resins of the present invention can be prepared according to several different known methods. In the so-called "one-shot" method, the polyol, organic diisocyanate, dihydroxy chain-extending agent, and other additives, if any, are simultaneously mixed and reacted at an elevated temperature. Another method involves the so-called "prepolymer" method in which a part or all of the polyol is first reacted with the diisocyanate to give an isocyanate-terminated prepolymer which subsequently is contacted and reacted with any remaining part of the polyol and the chain-extending agent. Variations of the above methods can also be used such as first reacting the chain-extending agent with the diisocyanate and then reacting the intermediate product with the polyol.

The thermoplastic polyurethane resins of this present invention are preferably prepared by a "one-shot", "bulk" preparation process in the absence of processing solvents such as dimethylformamide. In such a process the reactants are combined at a temperature of typically from 160° C. to 260° C. The resulting mixture is introduced into a suitable heated surface, preferably with degassing under reduced pressure, and is maintained at a temperature of from 40° C. to 190° C., preferably 90° C. to 120° C., until its viscosity increases and it starts to solidify. Generally, the point of solidification can be attained in a period of from a few seconds to a few minutes, depending on the system reactivity. At this stage, the "solidified" reaction mass is a material which can be cooled, diced and stored or alternatively extruded into desired particle shapes or sizes. When an extruder is used as reactor, the obtained polymer can be extruded directly to give strings or films, or be handled directly by an underwater dicer.

It is often desirable, but not essential, to include a catalyst in the preparation of thermoplastic polyurethanes of the present invention. Any of the catalysts conventionally used in the art to catalyze or accelerate the reaction of an isocyanate with a reactive hydrogen-containing compound can be used for this purpose; see for example, Saunders et al, *Polyurethanes, Chemistry and Technology,* Part I, Interscience, pp. 228–232, New York (1963), and Britain et al, *J. Applied Polymer Science,* 4, 207–211 (1960), which pages are incorporated herein. Such catalysts include organic and inorganic acid salts and organometallic derivatives of bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Illustrative of such catalysts are stannous octoate, stannous oleate, dibutyltin dioctoate, dibutyltin dilaurate, cobalt naphthenate, tetramethyltin, triethylamine, triethylenediamine, N,N,N',N'-tetramethylenediamine, N,N,N',N'-tetraethylenediamine, N-methylmorpholine, N-ethylmorpholine, N,N,N',N'-tetramethylguanidine or N,N'-diethylethanolamine. The amount of the catalyst employed is that amount which will effectively catalyze the reaction of hydroxyl-containing compounds with the aromatic diisocyanate. The specific amount will depend on the particular reactants and catalyst being employed. Generally, the amount of the catalyst used is within the range of from 0.0001 to 0.1 percent by weight based on the total weight of the reactants.

Component (b) in the compositions of this invention is chlorinated polyethylene ("CPE"). CPE can be prepared in a process in which a chlorine radical, generated from $Cl_2$ in a free-radical mechanism catalyzed by ultraviolet light or initiators, abstracts a hydrogen atom from a polyethylene chain, leaving a carbon radical. The carbon radical reacts with a molecule of chlorine to bond a chlorine atom to the polyethylene chain and liberates the other to continue the chain reaction. An alternative to $Cl_2$ as the chlorinating agent is $Cl_2O$. Polyethylene which retains regions of crystallinity during the reaction exhibit block chlorination whereas amorphous polyethylene, in which most or all portions of the polymer chain are accessible, exhibit random chlorination.

The polyethylene which is subjected to chlorination can be a homopolymer of ethylene or a copolymer of ethylene and one or more higher 1-alkenes such as propylene, butylene or octene. These polyethylenes typically have a density of about 0.90–0.97 $g/cm^3$, preferably about 0.935–0.967 $g/cm^3$, and a melt index of about 0.01–40 dg/min, preferably about 0.1–12 dg/min, and more preferably about 0.15–3 dg/min. Chlorination can occur in solution wherein a solvent such as a carbon tetrachloride is used at a temperature of about 60°–110° C. However, the process is more commonly run in an aqueous suspension wherein, in a first step, about 2 to 23 weight percent chlorination occurs at a temperature below the agglomeration temperature of the ethylene polymer, followed by chlorination to an extent of up to 75 percent, preferably up to 48 percent, by weight in a second step at a temperature above the first temperature but at least 2° C. below the crystalline melting point of the ethylene polymer. Wetting agents such as sulfonates or polyphosphates may be advantageously employed in the aqueous process. Such an aqueous process and others are more particularly described in U.S. Pat. Nos. 3,454,544 and 3,563,974, each of which is incorporated herein. Chlorination can also occur in an anhydrous process wherein powdered polyethylene is agitated while contacted with a stream or atmosphere of heated chlorine gas, as more particularly described in U.S. Pat. No. 4,425,206, which is incorporated herein, or by reacting the polymers in molten form, as more particularly described in U.S. Pat. No. 3,909,486, which is also incorporated herein.

The chlorine content of the CPE thus produced can be about 25 to 50 percent by weight, is preferably about 30 to 45 percent by weight, and is more preferably about 34 to 42 percent by weight. The weight average molecular weight of CPE may be about 50,000 to 350,000, preferably about 80,000 to 240,000, and more preferably about 175,000 to 225,000. CPE is typically low in crystallinity, as measured by differential scanning calorimetry, for example below about 5 cal/gram. In a preferred embodiment, the residual crystallinity of CPE is at or below 1 cal/gram.

In an alternative embodiment, the CPE used in the compositions of this invention can be a chlorosulfonated polyethylene ("CSM"). In the preparation of CSM, a carbon radical is generated on the polyethylene chain in a manner analogous to the preparation of CPE. Addition of a chlorine atom or a molecule of $SO_2$ then follows at the site of the carbon radical. If $SO_2$ is added at the carbon radical, a sulfur radical is generated, and addition of a chlorine atom then occurs at the sulfur radical. In a typical CSM, —$CH_2$— groups, —CHCl— groups and —$CHSO_2Cl$— groups are present in a ratio of about 108/32/1. Preparation of CSM can occur in a homogenous solution using, for example, carbon tetrachloride or methylene chloride as the solvent. When chlorobenzene is the solvent, a temperature of about 105°–110° C. at atmospheric pressure is typical. An initiator such as 2-methyl-2,2'-azobispropanenitrile is used. A process such as the foregoing is more particularly described in U.S. Pat. No. 3,299,014, which is incorporated herein.

Component (b) in the compositions of this invention also includes a CPE in which one or more ethylenically unsaturated monomers has been graft polymerized onto the polyethylene backbone. Such graft polymerization may be accomplished via a free radical mechanism and is commenced after the CPE has been in contact with the ethylenically unsaturated grafting monomer(s) allowing the ethylenically unsaturated monomer(s) to disperse into the CPE. The purpose of this contact time is to enable the grafting monomer(s) to penetrate the CPE thereby permitting enhanced graft polymerization during the polymerization step to form a network structure of CPE and grafted polymers or copolymers. A CPE which is not grafted with ethylenically unsaturated monomers may be employed in combination with a CPE which is graft polymerized.

Ethylenically unsaturated grafting monomers, such as ethylenically unsaturated carboxylic acid esters, useful in preparation of a grafted CPE can be aliphatic or aromatic and include one or more of the following: acrylates, alkyl acrylates, lower alkyl acrylates, alkyl methacrylates, lower alkyl methacrylates, and other carboxylic acid esters including vinyl esters e.g. vinyl acetate, vinyl propionate, vinyl butyrate, vinyl stearate, vinyl benzoate and vinyl p-chlorobenzoate, and monovinyl aromatic compounds, including styrene, alpha methyl styrene, t-butyl styrene, acrylonitrile, and other ethylenically unsaturated monomers suitable for copolymerization with a styrenic monomer as described below with reference to a styrenic copolymer.

Preferred grafting monomers are the alkyl methacrylates, the lower alkyl methacrylates, vinyl acetate, and styrene, with the most preferred being methyl methacrylate. Another highly preferred monomer is vinyl acetate. Preferred mixtures of monomers include mixtures of acrylates and styrenics, of alkyl acrylates and styrenics, of lower alkyl acrylates and styrenics, of alkyl methacrylates and styrenics, of lower alkyl methacrylates and styrenics, of acrylates and vinyl esters, of alkyl acrylates and vinyl esters, of lower alkyl acrylates and vinyl esters, of alkyl methacrylates and vinyl esters, and of lower alkyl methacrylates and vinyl esters. A highly preferred mixture is of methyl methacrylate and styrene. Another highly preferred mixture is of methyl methacrylate and vinyl acetate. As used in the description of the grafting monomers, the term alkyl refers to alkyl groups having from 1 to about 8 carbon atoms. The term lower alkyl refers to alkyl groups having from 1 to about 4 carbon atoms.

The polymerizable mixture comprises in a preferred embodiment from about 60 to 95 parts, more preferably from about 80 to 90 parts, by weight CPE and from about 5 to 40, more preferably from 10 to 20, parts by weight of an ethylenically unsaturated grafting monomer or comonomer mixture of monomers.

The preferred process for making a grafted CPE involves the mixing of CPE resin, an ethylenically unsaturated grafting monomer or mixture of monomers, water, initiators, and other additives such as a suspending agent in a suspension process reactor. The reactants are mixed through conventional stirred agitation and form a slurry suspension. Prior to the copolymerization in the aqueous suspension slurry it is important to disperse the monomers or comonomers into suspended CPE by diffusion. This intimately mixed CPE and monomer network will then copolymerize by free-radical initiation to form a network structure of CPE and grafted copolymers.

The reactor is then heated to a temperature of from about 70° C. to about 110° C. for a time of from about 4 hours to about 14 hours. Preferably the reactor is heated to a temperature of from about 75° C. to about 95° C. for a time of from about 6 hours to about 12 hours, and more preferably is heated to a temperature of from about 80° C. to about 90° C. for a time of from about 8 hours to about 10 hours.

After polymerization is complete, the grafted CPE product is dewatered and dried, for example, in a fluidized bed dryer, from about 4 to about 10 hours at a temperature of about 50° C. to about 75° C., preferably from about 5 to about 10 hours at a temperature of about 55° C. to about 70° C., and more preferably from about 6 to about 9 hours at a temperature of about 60° C. to about 65° C.

Initiators useful in this preferred free radical polymerization process are the known organic perester and peroxide type initiators. Especially useful are the organic perester and peroxide initiators having a one hour half-life temperature of about 90° C.– 120° C. Typical and useful perester and organic peroxide initiators are benzoyl peroxide, lauroyl peroxide, 1,1-di-(t-amylperoxy)-cyclohexane, 1-1-di-(t-butylperoxy)-cyclohexane, and tertiary butyl peroctoate. Tertiary butyl peroctoate having a one hour half-life temperature of about 115° C. is the most preferred initiator.

For obtaining a good suspension, vigorous stirring is performed and a suspension stabilizer or suspending agent is used. The conventional suspension stabilizers are preferred in this invention and include such organic materials as the polyvinyl alcohols, polyalkylene oxides and cellulose derivatives, with the cellulose derivatives being most preferred. Typical of the most preferred cellulose derivatives are methyl cellulose, hydroxymethyl cellulose, and methyl hydroxypropyl cellulose with hydroxymethyl cellulose being most preferred.

Methods for making a grafted CPE resin are discussed in greater detail in commonly assigned U.S. application Ser. No. 07/868,908, filed Apr. 16, 1992, which is incorporated herein.

Component (c) in the compositions of this invention is a styrenic copolymer prepared from one or more styrenic monomers and one or more ethylenically unsaturated monomers copolymerizable with a styrenic monomer. The styrenic copolymer may be a random, alternate, block or grafted copolymer, and a mixture of more than one styrenic copolymer may be used as well.

Styrenic monomers of particular interest for use in preparation of a styrenic copolymer, in addition to styrene itself, include one or more of the substituted styrenes or vinyl aromatic compounds described by the following formula (it being understood that a reference to "styrene" herein is to be read as a reference to any of the styrenic or vinyl aromatic monomers described herein or any others of like kind):

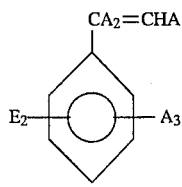

wherein each A is independently hydrogen, a $C_1$–$C_6$ alkyl radical or a halogen atom such as chlorine or bromine; and each E is independently hydrogen, a $C_1$–$C_{10}$ alkyl, cycloalkyl, alkenyl, cycloalkenyl, aryl, alkaryl, aralkyl or alkoxy radical, a halogen atom such as chlorine or bromine, or two E's may be joined to form a naphthalene structure. Representataive examples of suitable styrenic monomers, in addition to styrene itself, include one or more of the following: ring-substituted alkyl styrenes, e.g. vinyl toluene, o-ethylstyrene, p-ethylstyrene, ar-(t-butyl)styrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; ar-methoxy styrene, vinyl naphthalene or anthracene, p-diisopropenylbenzene, divinylbenzene, vinylxylene, alpha-methylstyrene, and alpha-methylvinyltoluene.

Ethylenically unsaturated monomers of particular interest for copolymerization with a styrenic monomer include one or more of those described by the formula: D—CH=C(D)—(CH$_2$)$_n$—G, wherein each D independently represents a substituent selected from the group consisting of hydrogen, halogen (such as fluorine, chlorine or bromine), $C_1$–$C_6$ alkyl or alkoxy, or taken together represent an anhydride linkage; G is hydrogen, vinyl, $C_1$–$C_{12}$ alkyl, cycloalkyl, alkenyl, cycloalkenyl, alkaryl, arylalkyl, alkoxy, aryloxy, ketoxy, halogen (such as fluorine, chlorine or bromine), cyano or pyridyl; and n is 0–9.

Representative examples of ethylenically unsaturated monomers copolymerizable with a styrenic monomer are those which bear a polar or electronegative group and include one or more of the following: a vinyl nitrile compound such as acrylonitrile, methacrylonitrile, ethacrylonitrile, alphachloroacrylonitrile and fumaronitrile; a diene such as butadiene, isoprene, isobutylene, piperylene, cyclopentadiene, natural rubber, chlorinated rubber, 1,2-hexadiene, methyl-1,3 -pentadiene, 2,3-dimethyl-1,3-1,3-pentadiene, 2-methyl-3-ethyl-1,3-butadiene, 2-ethyl-1,3-pentadiene, 1,3- and 2,4-hexadienes, chloro- and bromo-substituted butadienes such as dichlorobutadiene, bromobutadiene, chloroprene and dibromobutadiene, and butadiene/isoprene and isoprene/isobutylene copolymers; 1,3-divinylbenzene; 2-phenyl propene; a $C_2$–$C_{10}$ alkylene compound including halo-substituted derivatives thereof such as vinyl or vinylidine chloride; the alpha,beta-ethylenically unsaturated carboxylic acids, such as acrylic acid, methacrylic acid, maleic acid, succinic acid, acotinic acid and itaconic acid, and their anhydrides and $C_1$–$C_{10}$ alkyl, aminoalkyl and hydroxyalkyl esters and amides, such as alkyl acrylates and methacrylates such as methyl acrylate, propyl acrylate, butyl acrylate, octyl acrylate, methyl alphachloro acrylate, methyl, ethyl or isobutyl methacrylate, hydroxyethyl and hydroxypropyl acrylates, aminoethyl acrylate and glycidyl methacrylate; maleic anhydride; an alkyl or aryl maleate or fumarate such as diethylchloromaleate or diethyl fumarate; an aliphatic or aromatic maleimide, such as N-phenyl maleimide, including the reaction product of a $C_1$–$C_{10}$ alkyl or $C_6$–$C_{14}$ aryl primary amine and maleic anhydride; methacrylamide, acrylamide or N.N-diethyl acrylamide; vinyl ketones such as methyl vinyl ketone or methyl isopropenyl ketone; vinyl or allyl acetate and higher alkyl or aryl vinyl or allyl esters; vinyl alcohols; vinyl ethers such as $C_1$–$C_6$ alkyl vinyl ether and their alkyl-substituted halo derivatives; vinyl pyridines; vinyl furans; vinyl aldehydes such as acrolein or crotonaldehyde; vinyl carbazole; vinyl pyrrolidone; N-vinylphthalimide; and an oxazoline compound includes those of the general formula

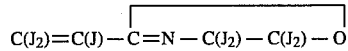

where each J is independently hydrogen, halogen, a $C_1$–$C_{10}$ alkyl radical or a $C_6$–$C_{14}$ aryl radical; and the like.

Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, aryl maleimimde/vinyl nitrile/diene/styrenic copolymer, strene/alkyl methacrylate copolymer, styrene/alkyl methacrylate/glydicyl methacrylate copolymer, styrene/butyl acrylate copolymer, methyl methacryalte/acrylonitrile/butadiene/styrene copolymer, or a rubber-modified vinyl aromatic/vinyl nitrile copolymer such as an ABS, AES or ASA copolymer.

ABS (acrylonitrile/butadiene/styrene copolymer) is an elastomeric-thermoplastic composite in which vinyl aromatic/vinyl nitrile copolymer is grafted onto a polybutadiene substrate latex. The polybutadiene forms particles of rubber—the rubber modifier or elastomeric component—which are dispersed as a discrete phase in a thermoplastic matrix formed by random vinyl aromatic/vinyl nitrile copolymer. Typically, vinyl aromatic/vinyl nitrile copolymer is both occluded in and grafted to the particles of rubber. AES (acrylonitrile/EPDM/styrene) copolymer is a styrenic copolymer which is obtained when vinyl aromatic/vinyl nitrile copolymer is rubber-modified by grafting vinyl aromatic/vinyl nitrile copolymer to a substrate made up of an EPDM (ethylene/propylene/non-conjugated diene) rubber. AES copolymers are discussed in greater detail in Henton, U.S. Pat. No. 4,766,175, which is incorporated as a part hereof. A vinyl aromatic/vinyl nitrile copolymer can also be crosslinked to an alkyl acrylate elastomer to form a rubber-modified styrenic copolymer, as in the case of an ASA (acrylonitrile/styrene/acrylate) copolymer, which is discussed in greater detail in Yu, U.S. Pat. No. 3,944,631, which is also incorporated as a part hereof.

The monomers copolymerized to form a styrenic copolymer may each be used in virtually any amount from 1 to 99 weight percent, but a styrenic copolymer will typically contain at least about 15 percent by weight, preferably at least about 35 percent by weight, and more preferably at least about 60 percent by weight of a styrenic monomer, with the balance being made up of one or more copolymerizable ethylenically unsaturated monomers. When rubber modified, a styrenic copolymer will typically contain at least about 15 percent by weight, preferably at least about 25 percent by weight, and more preferably at least about 35 percent by weight of a styrenic monomer, with the balance being made up of one or more copolymerizable ethylenically unsaturated monomers. In certain embodiments, a vinyl nitrile monomer is used in a styrenic copolymer in an amount of greater than 35 percent, typically greater than 40 percent, advantageously greater than 45 percent, desirably greater than 50 percent, preferably greater than 55 percent, and more preferably greater than 60 percent, by weight of the styrenic copolymer.

The elastomeric phase of a rubber-modified styrenic copolymer as employed in the compositions of this invention is up to about 45 percent, preferably about 5 to 40 percent, more preferably about 10 to 35 percent, by weight of the copolymer. The preferred elastomeric phase exhibits a glass transition temperature ($T_g$) generally less than 0° C., more preferably less than −30° C., and most preferably from about −110° C. to about −50° C. as determined by ASTM D-746-52T or -56T. The elastomeric phase advantageously has an average particle size of about 10 microns or less, preferably in the range from about 0.05 to about 5 microns, and more preferably in the range from about 0.1 to about 0.3 microns, and typically exhibits an intrinsic viscosity, as determined at 25° C. in toluene, of about 0.1 to about 5. In addition to the aforementioned monomeric components, it should be understood that the elastomeric phase may also contain relatively small amounts, usually less than about 2 weight percent based on the rubber, of a crosslinking agent such a divinylbenzene, diallylmaleate, ethylene glycol dimethacrylate and the like provided that such crosslinking does not eliminate the desired elastomeric character of rubber.

The molecular weight of a styrenic copolymer is not particularly critical so long as its melt flow viscosity is such that it can be melt blended with the other components of the compositions of this invention. Preferably, however, the melt flow viscosity of the styrenic copolymer as determined by ASTM D-1238-65T(1) is from about 0.01 to about 10, more preferably from about 0.1 to about about 5, and most preferably from about 2 to about 3, deciliters per minute. The type and amount of the ethylenically unsaturated monomer(s) in the styrenic copolymer are such that the solubility parameter of the styrenic copolymer is typically from about 9.2 to about 11.2, preferably from about 9.3 to about 10.8, although values outside such ranges are permitted as well. When the ethylenically unsaturated monomer possesses a polar group, the polar group typically has a group moment of about 1.4 to 4.4 Debye units, although values outside such ranges are permitted as well.

A styrenic copolymer may be made by an emulsion, suspension or mass (bulk) method. For example, when ABS is made by emulsion polymerization, a rubber substrate latex is produced in an aqueous emulsion by a polymerization, which can be initiated by organic peroxides, persulfates or redox systems, of 1,3-butadiene alone or in combination with other vinyl monomers such as styrene or methacrylonitrile. The proportion of butadiene to other monomers in the substrate latex is usually in the range of about 2/1 to about 15/1. The rubber latex substrate is subjected to further aqueous emulsion polymerization, using similar initiators or azo compounds, with styrene and acrylonitrile monomers, and optionally other vinyl monomers, wherein the concentration of styrene is usually about 1.5 to 3.5 times that of acrylonitrile. SAN is formed, some of which is grafted to the rubber latex substrate, and some of which as free copolymer forms a rigid matrix. The latex containing both the grafted rubber and the free SAN is then mixed with a coagulant solution, heated and agitated to produce discrete particles of ABS resin. The slurry containing those particles is dewatered in a centrifuge, and the resin is dried.

When ABS is made by suspension polymerization, a pre-formed elastomeric (rubber) component, usually a polybutadiene or a butadiene/styrene copolymer, is dissolved in a mixture of styrene and acrylonitrile, and, optionally, other vinyl monomers. The preferred ratio of styrene to acrylonitrile is about 90/10 to about 60/40, and in the preferred recipe the rubber component constitutes from about 4 percent to less than about 40 percent of the product. The rubber component, monomers and initiator are charged to the reaction vessel and polymerization ensues at about 60°–140+ C. until a conversion rate of about 15 percent to about 30 percent is reached, resulting in the production of a prepolymer. Phase inversion occurs, and the rubber precipitates from solution and becomes the discontinuous phase dispersed as particles ranging from 0.1 to 5 microns in size. The prepolymer is then placed in a suspension reactor in an aqueous solution containing a suspending agent, initiator and chain transfer agent. Typical suspending agents are carboxymethyl cellulose, polyvinyl alcohol, and polyglycol ethers. Typical initiators for the polymerization which occurs during suspension are t-butyl perbenzoate, di-t-butyl peroxide, or t-butylperoxy isopropyl carbonate. Agitation of the solution completes the polymerization. The process is completed by dewatering the slurry in a centrifuge, and moisture content is further reduced by flash drying.

When ABS is made by bulk or mass polymerization, it is formed by dissolving an elastomeric (rubber) component in the monomer mix, which contains styrene and acrylonitrile (and, optionally, other vinyl monomers), an initiator and, frequently, a chain transfer agent such as a mercaptan or a terpinolene. The reaction can, however, be thermally initiated. The styrene and acrylonitrile monomers polymerize at about 60°–100° C., some grafting to the rubber component, but most forming a monomer-polymer solution. As the relative volume of the monomer-SAN polymer phase increases, discrete rubber particles become dispersed in the matrix resulting from the monomer-SAN polymer phase. The rubber particles are stabilized by being grafted to SAN polymers at the interface between the particles and the SAN polymer matrix. Additional stabilization is furnished when monomer becomes occluded, and polymerizes, within the rubber particles. Because polymerization occurs completely within a monomer/polymer medium, viscosity increases as conversion increases. To allow continued agitation of the reaction mixture despite such increasing viscosity, diluents such as methyl ethyl ketone and ethylbenzene are added to the reactor. Upon the completion of polymerization, the melt is devolatilized using equipment such as a devolatilizing extruder or a flash evaporator, and vacuum is applied to remove unreacted monomers and diluents.

Methods for making ABS or other styrenic copolymers, as described above, are discussed in greater detail in Childers, U.S. Pat. No. 2,820,773, Calvert, U.S. Pat. No. 3,238,275, Carrock, U.S. Pat. No. 3,515,692, Ackerman, U.S. Pat. No. 4,151,128, Kruse, U.S. Pat. No. 4,187,260, Simon, U.S. Pat. No. 4,252,911 Weber, U.S. Pat. No. 4,526,926, Rudd, U.S. Pat. No. 4,163,762 and Weber, U.S. Pat. No. 4,624,986, each being hereby incorporated as a part hereof.

Component (d) in the compositions of this invention is an elastomeric impact modifier, several different varieties of which, or a mixture thereof, are suitable for use herein. The elastomeric impact modifier as used herein typically has an elastomer or rubber content of greater than 45 percent by weight. One form which such elastomeric impact modifier may take is a thermoplastic elastomer, i.e. that which is frequently characterized, for example, in that it can be melted and recooled, or dissolved and reformed upon recovery from solvent, without undergoing any significant change in properties. A thermoplastic elastomer is usually also characterized by the randomness of the shape and size it assumes when mixed by shearing forces with the other components contained in the compositions of this invention, especially when heat is applied during such mixing. Because a thermoplastic elastomer is typically a long chain molecule, segments of a thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix.

One example of a thermoplastic elastomer is a block copolymer which can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is frequently prepared by polymerizing one or more vinyl aromatic hydrocarbon monomers, and has a weight average molecular weight of about 4,000 to about 115,000, preferably about 8,000 to about 60,000. The B portion of the block copolymer typically results from polymerizing a diene and has a weight average molecular weight of about 20,000 to about 450,000, preferably about 50,000 to about 300,000. In an A-B di-block copolymer, each block, A or B, can vary from 10–90% of the total weight of the copolymer. In an A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block of a vinyl aromatic block copolymer is polymerized predominantly from the various styrenic monomers described above with respect to a styrenic copolymer, but minor proportions of other copolymerizable ethylenically unsaturated monomers (also described above in the same context) may be used as well. The polymerization can be initiated by lithium metal, or alkyl- or aryl lithium compounds such as butyl lithium or isoamyl lithium. Polymerization is normally conducted at temperatures ranging from about −20° C. to about 100° C.

The B block of the copolymer can be formed, for example, simply by injecting suitable monomer into the reaction vessel and displacing the lithium radical from the just-polymerized A block, which then acts as an initiator because it is still charged. The B block is formed predominantly from substituted or unsubstituted $C_2$–$C_{10}$ dienes, particularly conjugated dienes such as butadiene or isoprene. Other diene or copolymerizable ethylenically unsaturated monomers (described above in connection with a styrenic copolymer) may be used in the formation of the B block provided that they are present at a level low enough to not alter the fundamental olefinic character of the B block. The B block will be characterized by elastomeric properties which allow it to to absorb and dissipate an applied stress and then regain its shape. In the A-B-A tri-block copolymer, the second end block A can be formed in a manner similar to the first, by injecting appropriate vinyl aromatic monomer into the reaction vessel.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. Vinyl aromatic/diene block copolymers such as are described above are discussed in greater detail in Holden, U.S. Pat. No. 3,265,766, Haefele, U.S. Pat. No. 3,333,024, Wald, U.S. Pat. No. 3,595,942, and Witsiepe, U.S. Pat. No. 3,651,014, each of which is incorporated herein, and many are available commercially as the varios Kraton™ elastomers from Shell Chemical Company.

Linear, branched, radial or teleblock A-B-A or A-B block copolymer thermoplastic elastomers can also be prepared from materials other than vinyl aromatic systems. These other copolymers also have a rigid block "A" having a $T_g$ above room temperature (approximately 23°–25° C.) and a rubbery block "B" having a $T_g$ below room temperature. Examples of typical pairings of the various materials used to form the respective A and B blocks of such other block copolymer thermoplastic elastomers are shown below in Table I.

TABLE I

| Block Copolymer Pairings | |
|---|---|
| A block | B block |
| polyethylene | ethylene/butylene copolymer |
| polyurethane | polyester polyether |
| polyester | polyether |
| polypropylene | EPDM rubber |

These non-vinyl aromatic block copolymer thermoplastic elastomers can also be prepared, for example, by anionic polymerization using an alkyl-lithium initiator. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014, each of which is incorporated herein.

Other thermoplastic elastomers useful in the compositions of this invention are those based generally on a long-chain, hydrocarbon backbone ("olefinic elastomers"), which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin polymer or copolymer such as ethylene/propylene copolymer or ethylene/propylene/diene copolymer, which may be grafted with one or more styrenic monomers; neoprene rubber; nitrile rubber; polybutadiene and polyisoprene.

An example of a preferred olefinic elastomer is a copolymer which has a a glass transition temperature ($T_g$) less than 0° C. prepared from (i) at least one olefin monomer such as ethylene, propylene, isopropylene, butylene or isobutylene, or at least one conjugated diene such as butadiene, and the like, or mixtures thereof; and (ii) an ethylenically unsaturated monomer carrying an epoxide group (for example, glycidyl methacrylate), and, optionally, (iii) an ethylenically unsaturated monomer which does not carry an epoxide group (for example, vinyl acetate). $T_g$ is the temperature or temperature range at which a polymeric material shows an abrupt change in its physical properties, including, for example, mechanical strength. $T_g$ can be determined by differential scanning calorimetry.

The random shape and size assumed in the polymer composition matrix by a thermoplastic elastomer is to be distinguished from the shape and size assumed by a core-shell graft copolymer. A core-shell graft copolymer is typically present in the polymer matrix in a bead shape both before and after mixing by application of shearing forces, whether heat is used or not, and is usually present in a rather narrow size range, for example 0.05–0.8 microns. The retention of this core-shell, or spherical, shape by the graft copolymer, even after heating and mixing, results from the fact that the outer layers, which surround the core, are formed by grafting appropriate monomers onto the core. A core-shell graft copolymer typically cannot be melted and recooled without a significant change in properties because the graft copolymer will tend to decompose or crosslink, and the bead-shaped segments of graft copolymer will tend to agglomerate upon melting, making dispersion of them by mixing difficult.

Representative examples of the core-shell graft copolymer elastomers suitable for use herein are those which are based on either a diene rubber, an alkyl acrylate rubber, or on mixtures thereof.

A core-shell graft copolymer based on a diene rubber contains a substrate latex, or core, which is made by polymerizing a diene, preferably a conjugated diene, or by copolymerizing a diene with a mono-olefin or a polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 10° C., and preferably less than about –20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$–$C_8$ alkyl acrylate such as ethyl acrylate or hexyl acrylate; a $C_1$–$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494, each of which is incorporated herein.

An core-shell graft copolymer based on an alkyl acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$, most preferably butyl acrylate. The elastomeric core phase should have a $T_g$ of less than about 10° C., and preferably less than about –20° C. About 0.1 to 5 weight percent of (i) a cross-linking monomer which has a plurality of addition polymerizable reactive groups all of which polymerize at substantially the same rate, such as butylene diacrylate, and (ii) a graft-linking monomer which has a plurality of addition polymerizable reactive groups some of which polymerize at substantially different rates than others, such as diallyl maleate, is typically polymerized as part of the elastomeric core.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$–$C_8$ alkyl acrylate like methyl acrylate, hydroxy ethyl acrylate or hexyl acrylate, or a $C_1$–$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 45% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928, each of which is incorporated herein.

Component (e) is poly(vinyl chloride) ("PVC"). PVC can be prepared by suspension polymerization at about 50°–75° C. in a batch process in which vinyl chloride monomer, $CH_2=CHCl$, ("VCM") is dispersed in water in a stirred reactor. A free radical initiator which is soluble in the VCM, such as an azo or peroxide initiator, is used. In the suspension process, VCM can further be copolymerized with other vinyl monomers, such vinyl acetate, acrylonitrile, butadiene, butyl acrylate, maleic anhydride, an olefin or styrene, to produce a random, block or graft copolymer.

PVC can also be prepared in a bulk or mass system in which VCM and a monomer-soluble initiator, such as acetyl cyclohexane sulfonyl peroxide, are stirred in the absence of water at about 62°–75° C. Methods such as the foregoing for the preparation of PVC are discussed in more detail in *Handbook of Polymer Synthesis, Part A,* Kricheldorf, Ed., Marcel Dekker, Inc., 1992, pages 172–182, which pages are incorporated herein.

The chlorine content of PVC is typically about 56.7 percent by weight. The weight average molecular weight of PVC is typically about 50,000 to 150,000, is preferably about 75,000 to 125,000, and is more preferably about 85,000 to 115,000. The solution viscosity of PVC, when measured as a 0.20 concentration in cyclohexanone at 30° C., may be about 0.5 to 1.1, and preferably about 0.89 to 0.93, centipoises.

Component (f) in the compositions of this invention is a molding polymer selected from (i) polyacetal, (ii) polyacrylate, (iii) polyamide, (iv) an epoxy resin, (v) polyester, (vi) ethylene/carbon monoxide copolymer, (vii) poly(phenylene ether), and (viii) polystyrene, and mixtures thereof. Suitable varities of such molding polymers are described in commonly assigned, concurrently filed U.S. application bearing attorney's docket number 39,323, which is incorporated herein.

A variety of additives may be advantageously employed to promote flame retardance or ignition resistance in the compositions of this invention. Representative examples thereof include the oxides and halides of the metals of Groups IVA and VA of the periodic table such as the oxides and halides of antimony, bismuth, arsenic, tin and lead such as antimony oxide, antimony chloride, antimony oxychloride, stannic oxide, stannic chloride and arsenous oxide; the organic and inorganic compounds of phosphorous, nitrogen, boron and sulfur such as aromatic phosphates and phosphonates (including halogenated derivatives thereof), alkyl acid phosphates, tributoxyethyl phosphate, 1,3-dichloro-2-propanol phosphate, 3,9-tribromoneopentoxy-2,4,8,10-tetraoxa-3,9diphosphaspiro-(5.5)undecane-3,9-dioxide, phosphine oxides, ammonium phosphate, zinc borate, thiourea, urea, ammonium sulfamate, ammonium polyphosphoric acid and stannic sulfide; the oxides, halides and hydrates of other metals such as titanium, vanadium, chromium and magnesium such as titanium dioxide, chromic bromide, zirconium oxide, ammonium molybdate and stannous oxide hydrate; antimony compounds such as antimony phosphate, sodium antimonate, $KSb(OH)_6$, $NH_4SbF_6$ and $SbS_3$; antimonic esters of inorganic acids, cyclic alkyl antimonite esters and aryl antimonic acid compounds such as potassium antimony tartrate, the antimony salt of caproic acid, $Sb(OCH_2CH_3)$, $Sb[OCH(CH_3)CH_2CH_3]_3$, antimony polyethylene glycorate, pentaerythritol antimonite and triphenyl antimony; boric acid; alumina trihydrate; ammonium fluoroborate; molybdenum oxide; halogenated hydrocarbons such as hexabromocyclodecane; decabromomdiphenyl oxide; 1,2-bis(2,4,6-tribromophenoxy)ethane; halogenated carbonate oligomers such as those prepared from Tetrabromobisphenol-A; halogenated epoxy resins such as brominated glycidyl ethers; tetrabromo phthalic anhydride; fluorinated olefin polymers or copolymers such as poly(tetrafluoroethylene); octabromodiphenyl oxide; ammonium bromide; isopropyl di(4-amino benzoyl)isostearoyl titanate; and metal salts of aromatic sulfur compounds such as sulfates, bisulfates, sulfonates, sulfonamides and sulfimides; other alkali metal and alkaline earth metal salts of sulfur, phosphorus and nitrogen compounds; and others as set forth in Laughner, U.S. Pat. No. 4,786,686, which is incorporated herein; and the like, and mixtures thereof. A preferred flame retardant additive is antimony trioxide ($Sb_2O_3$). When a flame retardant is used in the compositions of this invention, it is typically used in an amount of up to about 15 percent, advantageously from about 0.01 to 15 percent, preferably from about 0.1 to 10 percent and more preferably from about 0.5 to 5 percent, by weight of the total composition.

A variety of additives may be advantageously used in the compositions of this invention for other purposes such as the following: antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as talc, clay, mica, silica, quartz, kaolin, aluminum nitride, $TiO_2$, calcium sulfate, $B_2O_3$, alumina, glass flakes, beads, whiskers or filaments, nickel powder and metal or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxyalte; ultraviolet light stabilizers such as a hindered amine, an o-hydroxy-phenylbenzotriazole, a 2-hydroxy,4-alkoxybenzophenone, a salicylate, a cyanoacrylate, a nickel chelate and a benzylidene malonate and oxalanilide. A preferred hindered phenolic antioxidant is Irganox™ 1076 antioxidant, available from Ciba-Geigy Corp. Such additives, if used, typically do not exceed 45 percent by weight of the total composition, and are advantageously from about 0.001 to 15 percent, preferably from about 0.01 to 10 percent and more preferably from about 0.1 to 10 percent, by weight of the total composition.

An acid acceptor or scavenger may be advantageously used in the compositions of this invention to enhance thermal stability in view of the tendency of CPE to liberate HCl when heated. Suitable acid acceptors are barium phosphate, epoxidized soybean oil and calcium stearate. When an acid acceptor is used in the compositions of this invention, it is typically used in an amount of up to about 10 percent, advantageously from about 0.001 to 10 percent, preferably from about 0.01 to 5 percent and more preferably from about 0.01 to 1 percent, by weight of the total composition.

To illustrate the practice of this invention, an example of one specific preferred embodiment is set forth below. It is not intended, however, that this example should in any manner restrict the scope of this invention.

EXAMPLE 1

The composition of Example 1 is prepared by mixing 20 weight percent thermoplastic polyurethane (PELLETHANE® 2102-80-A polyurethane from The Dow Chemical Company), 27.4 weight percent styrene/acrylonitrile copolymer, 50 weight percent chlorinated polyethylene (containing 36 weight percent chlorine), and 0.5 weight percent epoxidized soybean oil for 30 seconds in a Lightnin blender equipped with an internal shaft. To this is added 2 weight percent barium phosphate and 0.1 weight percent Irganox™ 1076 antioxidant. The resulting mixture is blended for another 30 seconds on the Lightnin blender with internal shaft. This final dry-blended formulation is passed through a 30 mm Werner-Pfleiderer twin-screw extruder, with all barrel zones at 180° C. and pelletized The extruded pellets are post blended and are dried in an air draft oven for at least 4 hours at 80° C. The dried pellets are then molded into bars on a 55 ton Negri Bossi molding machine for testing.

The following tests are performed on Example 1. Impact resistance is measured by the Izod test according to ASTM Designation D 256-84 (Method A) at room temperature (73° F.) and at 0° F. The notch is 10 mils (0.254 mm) in radius. The Izod results are 13 ft-lb/in at both 73° F. and 0° F.

Heat deflection temperature under load is measured in accordance with ASTM Designation D 648-82 at 264 psi. The result is 160° F.

Flexural modulus is measured in accordance with ASTM Designation D 790-84a. The result is 90 kpsi.

These results show that a polyurethane/CPE blend is a useful composition for molding purposes. The molded composition shows good heat resistance and impact strength, particularly at low temperature. By contrast, a similarly stabilized composition containing 20 weight percent polycarbonate, 30 weight percent styrene/acrylonitrile copolymer, and 50 weight percent chlorinated polyethylene had only 2.4 ft-lb/in Izod value at 0° F.

What is claimed is:

1. A composition of matter comprising, in admixture, (a) a thermoplastic polyurethane and (b) chlorinated polyethylene to which is graft polymerized one or more ethylenically unsaturated monomers selected from the group consisting of a vinyl aromatic compound, a vinyl nitrile compound, a vinyl or vinylidene chloride, a $C_1$–$C_{10}$ amide of a carboxylic acid, an aliphatic or aromatic maleimide, a vinyl alcohol, a vinyl ether, a vinyl aldehyde and an oxazoline compound.

2. The composition of claim 1 wherein the thermoplastic polyurethane is prepared from a polyether diol having at least about 50 weight percent oxyethylene units.

3. The composition of claim 1 wherein the thermoplastic polyurethane is prepared from a poly(ethylene adipate)diol.

4. The composition of claim 1 wherein the thermoplastic polyurethane is prepared from a polyether diol having at least about 50 weight percent oxyethylene units, or a poly(ethylene adipate)diol, or a mixture thereof, and diphenylmethane-2,4'-diisocyanate, diphenylmethane-4,4'-diisocyanate or a toluene diisocyanate, or a mixture thereof.

5. The composition of claim 1 wherein the ethylenically unsaturated monomer is a vinyl nitrile compound, a vinyl or vinylidene chloride, a $C_1$–$C_{10}$ amide of a carboxylic acid, an aliphatic or aromatic maleimide, a vinyl alcohol, a vinyl ether, a vinyl aldehyde, an oxazoline compound, or a mixture thereof.

6. The composition of claim 1 wherein the ethylenically unsaturated monomer is styrene, acrylonitrile, or a mixture thereof.

7. The composition of claim 1 further comprising chlorinated polyethylene to which an ethylenically unsaturated monomer has not been graft polymerized.

8. The composition of claim 1 further comprising a styrenic copolymer.

9. The composition of claim 8 wherein the styrenic copolymer is selected from the group consisting of a vinyl aromatic/vinyl nitrile copolymer and a rubber-modified vinyl aromatic/vinyl nitrile copolymer.

10. The composition of claim 9 wherein the rubber-modifier in the rubber-modified vinyl aromatic/vinyl nitrile copolymer is polymerized from a diene, an olefin monomer, an alkyl acrylate or methacrylate, a vinyl aromatic compound or a vinyl nitrile compound or a mixture thereof.

11. The composition of claim 1 further comprising an elastomeric impact modifier.

12. The composition of claim 1 further comprising poly(vinyl chloride).

13. The composition of claim 1 further comprising one or more molding polymers selected from the group consisting of polyacetal, polyacrylate, polyamide, an epoxy resin, polyester, an ethylene/carbon monoxide copolymer, poly(phenylene ether), and polystyrene.

14. The composition of claim 13 wherein the molding polymer is an epoxy resin the formula

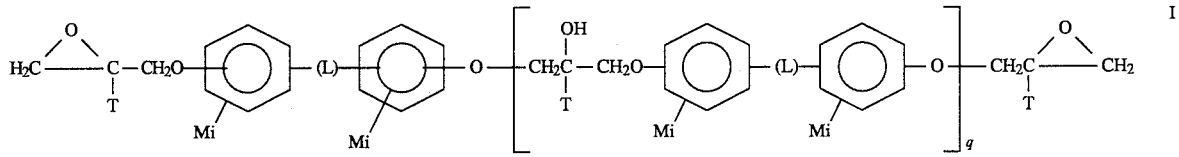

15. The composition of claim 14 further comprising an antimony compound.

16. The composition of claim 15 further comprising a fluorinated olefin polymer or copolymer.

17. The composition of claim 1 which has a V-0 rating in the U.L.-94 burn test.

18. The composition of claim 1 which has a 5 V rating in the U.L.-94 burn test.

19. The composition of claim 16 further comprising a styrenic copolymer.

20. The composition of claim 16 further comprising chlorinated polyethylene to which an ethylenically unsaturated monomer has not been graft polymerized.

21. The composition of claim 1 in the form of a molded, extruded or shaped article.

22. The composition of claim 16 in the form of a molded, extruded or shaped article.

23. The composition of claim 5 further comprising an epoxy resin, an antimony compound and a fluorinated olefin polymer or copolymer thereof.

24. The composition of claim 23 further comprising a styrenic copolymer.

25. The composition of claim 5 further comprising a styrenic copolymer.

26. The composition of claim 5 further comprising chlorinated polyethylene to which an ethylenically unsaturated monomer has not been graft polymerized.

27. The composition of claim 5 in the form of a molded, extruded or shaped article.

* * * * *

UNITED STATES PATENT AND TRADEMARK OFFICE
CERTIFICATE OF CORRECTION

PATENT NO. : 5,457,146

DATED : October 10, 1995

INVENTOR(S) : Samuel A. Ogoe and Thomas D. Burns

It is certified that error appears in the above-identified patent and that said Letters Patent is hereby corrected as shown below:

Column 22, line 1-2, claim 14, should read

-- The composition of claim 13 wherein the molding polymer is an epoxy resin.--

Signed and Sealed this

Twenty-third Day of July, 1996

Attest:

BRUCE LEHMAN

Attesting Officer

Commissioner of Patents and Trademarks